United States Patent
Goswami et al.

(10) Patent No.: US 7,286,937 B2
(45) Date of Patent: Oct. 23, 2007

(54) ESTIMATING FORMATION PROPERTIES FROM DOWNHOLE DATA

(75) Inventors: Jaideva C. Goswami, Houston, TX (US); Ali Ozbek, Cambridgeshire (GB); Amit Mukherjee, Houston, TX (US); Reza Taherian, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 25 days.

(21) Appl. No.: 11/124,528

(22) Filed: May 6, 2005

(65) Prior Publication Data

US 2006/0161352 A1 Jul. 20, 2006

Related U.S. Application Data

(60) Provisional application No. 60/644,452, filed on Jan. 14, 2005.

(51) Int. Cl.
*G01V 3/38* (2006.01)
(52) U.S. Cl. .................. 702/11; 702/9; 702/7
(58) Field of Classification Search ............ 702/11, 702/12, 13, 7, 6; 703/2, 10
See application file for complete search history.

(56) References Cited

U.S. PATENT DOCUMENTS

| | | | | |
|---|---|---|---|---|
| 4,513,376 | A * | 4/1985 | Barber | 702/7 |
| 4,785,196 | A | 11/1988 | Reed | |
| 5,146,167 | A * | 9/1992 | Strickland et al. | 324/339 |
| 5,157,605 | A * | 10/1992 | Chandler et al. | 702/7 |
| 5,210,691 | A * | 5/1993 | Freedman et al. | 702/7 |
| 5,282,133 | A * | 1/1994 | Watson | 702/8 |
| 5,329,235 | A * | 7/1994 | Zhou et al. | 324/338 |
| 5,350,925 | A * | 9/1994 | Watson | 250/269.3 |
| 5,379,216 | A * | 1/1995 | Head | 702/12 |
| 5,619,411 | A * | 4/1997 | Smith | 702/8 |
| 5,675,147 | A | 10/1997 | Ekstrom | |
| 5,859,811 | A * | 1/1999 | Miller et al. | 367/35 |
| 5,867,806 | A * | 2/1999 | Strickland et al. | 702/7 |
| 6,366,088 | B1 * | 4/2002 | Hagiwara | 324/303 |
| 6,914,433 | B2 * | 7/2005 | Wright et al. | 324/336 |

(Continued)

OTHER PUBLICATIONS

J.C. Goswami et al., *A Robust Technique for Well-Log Data Inversion*, IEEE Transaction on Antennas and Propagation, pp. 717-724, Mar. 2004.

(Continued)

*Primary Examiner*—Donald E McElheny, Jr.
(74) *Attorney, Agent, or Firm*—Kevin P. McEnancy; Bryan L. White; Brigitte L. Echals

(57) ABSTRACT

Methods and systems for extracting formation properties from formation logging data is disclosed. A method includes obtaining a deconvolution filter; and processing the formation logging data using the deconvolution filter to produce estimates of the formation properties. The estimates of the formation properties may be further processed with a diffusion filter, which may be an anisotropic diffusion filter. A system for extracting formation properties from formation logging data includes a central processing unit and a memory, wherein the memory stores a program having instructions for performing a method that includes designing a deconvolution filter; and processing the formation logging data using the deconvolution filter to produce estimates of the formation properties.

21 Claims, 6 Drawing Sheets

U.S. PATENT DOCUMENTS

| | | | |
|---|---|---|---|
| 7,042,225 B2 * | 5/2006 | Barber | 324/338 |
| 2003/0107378 A1 * | 6/2003 | Strickland et al. | 324/339 |
| 2005/0034917 A1 * | 2/2005 | Mathiszik et al. | 181/108 |
| 2005/0075789 A1 * | 4/2005 | Xiao et al. | 702/6 |
| 2005/0127917 A1 * | 6/2005 | Barber | 324/338 |
| 2005/0165553 A1 | 7/2005 | Jammes et al. | |

OTHER PUBLICATIONS

J. Bendat et al., *Random Data Analysis and Measurement Procedures*, $3^{rd}$ ed., pp. 219-271, John Wiley & Sons, NY, NY (2000).

* cited by examiner

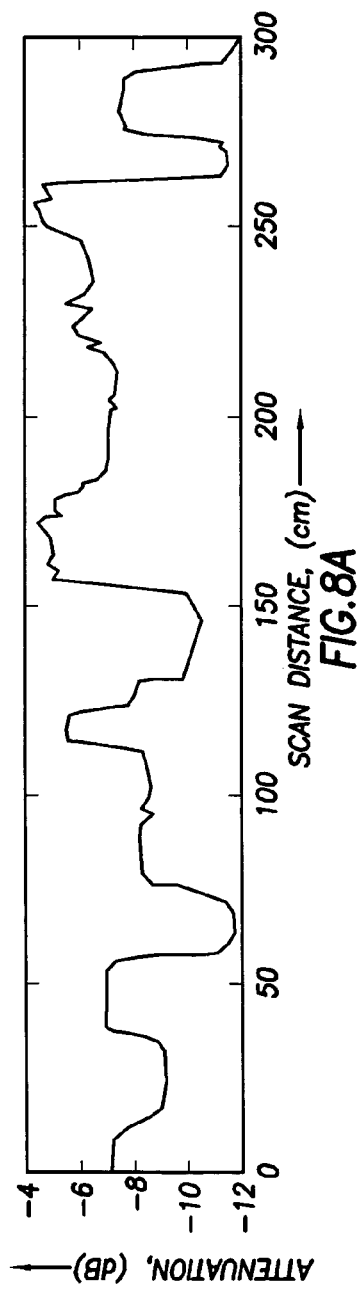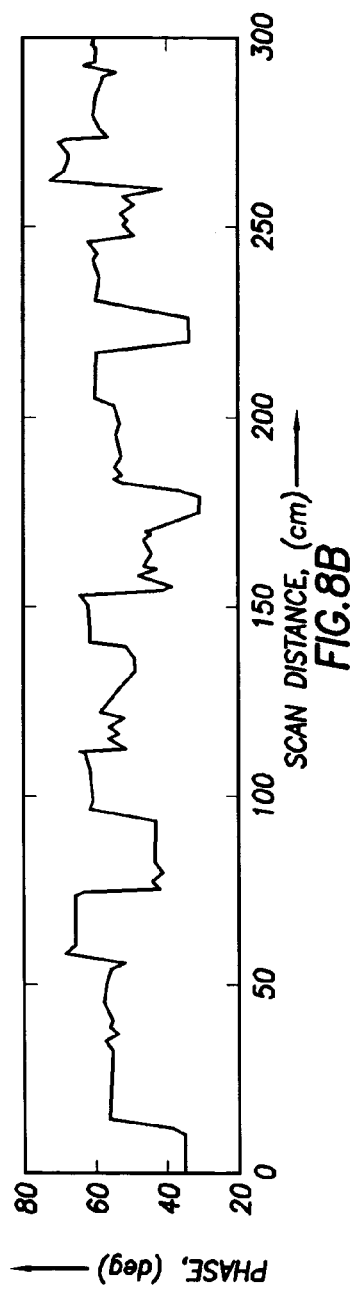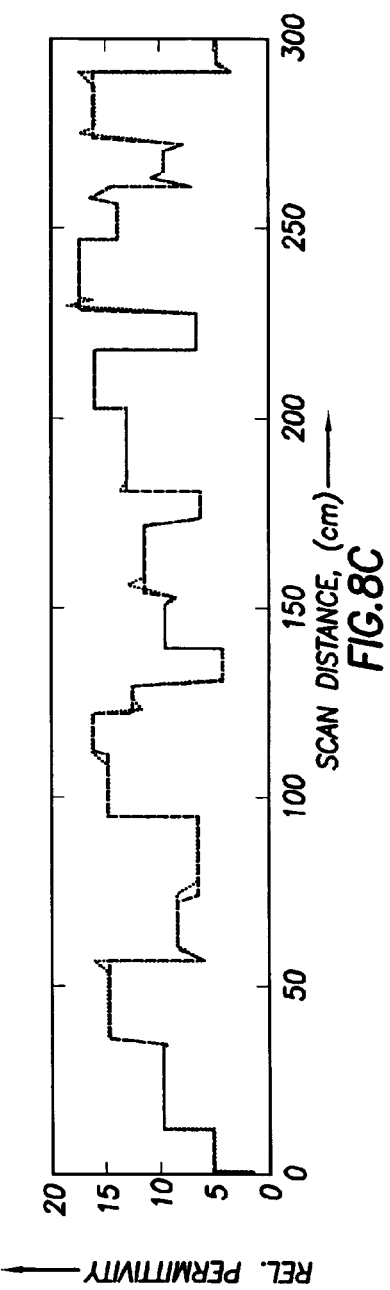

ESTIMATING FORMATION PROPERTIES FROM DOWNHOLE DATA

CROSS-REFERENCE TO RELATED APPLICATIONS

This claims benefit of U.S. Provisional Patent Application Ser. No. 60/644,452 filed on Jan. 14, 2005. This Provisional Application is incorporated by reference in its entirety.

STATEMENT REGARDING FEDERALLY SPONSORED RESEARCH OR DEVELOPMENT

Not applicable.

BACKGROUND OF INVENTION

1. Field of the Invention

The invention relates generally to oil and gas exploration, particularly to methods and systems for deriving formation properties from formation logging data.

2. Background Art

Various well logging techniques are known in the field of hydrocarbon and water exploration and production. These techniques typically employ logging or downhole tools (sondes) equipped with sources adapted to emit energy through a borehole traversing the subsurface formation. The emitted energy interacts with the surrounding formation to produce signals that are detected and measured by one or more sensors on the instrument. By processing the detected signal data, a profile of the formation properties is obtained.

Subsurface or downhole logging techniques are realized in different ways as known in the art. A well tool, comprising a number of transmitting and detecting devices for measuring various parameters, can be lowered into a borehole on the end of a cable or wireline. The cable, which is attached to some mobile processing center at the surface, is the means by which parameter data may be sent up to the surface. With this type of logging, it becomes possible to measure borehole and formation parameters as a function of depth, i.e., while the tool is being pulled uphole.

An alternative to wireline logging techniques is the collection of data on downhole conditions during the drilling process. By collecting and processing such information during the drilling process, the driller can modify or correct key steps in the operation to optimize performance. Schemes for collecting data of downhole conditions and movement of the drilling assembly during the drilling operation are known as measurement-while-drilling (MWD) techniques. Similar techniques focusing more on measurement of formation parameters than on movement of the drilling assembly are known as logging-while-drilling (LWD). Note that drilling operations may also use casings or coil tubings instead of conventional drill strings. Casing drilling and coil tubing drilling are well known in the art. In these situations, logging operations may be similarly performed as in conventional MWD or LWD. In this description, "logging-while-drilling" will be generally used to include the use of a drill string, a casing, or a coil tubing, and hence MWD and LWD are intended to include operations using casings or coil tubings. Logging-while-tripping (LWT) is an alternative to LWD and MWD techniques. In LWT, a small diameter "run-in" tool is sent downhole through the drill pipe, at the end of a bit run, just before the drill pipe is pulled. The run-in tool is used to measure the donwhole physical quantities as the drill string is extracted or tripped out of the hole. Measured data is recorded into tool memory versus time during the trip out. At the surface, a second set of equipment records bit depth versus time for the trip out, and this allows the measurements to be placed on depth. Sensors or tools permanently placed in a wellbore may also be used to obtain log data. Embodiments of the invention may use data obtained with any of these different logging methods.

FIG. 1 shows a typical LWD system that includes a derrick 10 positioned over a borehole 11. A drilling tool assembly, which includes a drill string 12 and drill bit 15, is disposed in the borehole 11. The drill string 12 and bit 15 are turned by rotation of a Kelly 17 coupled to the upper end of the drill string 12. The Kelly 17 is rotated by engagement with a rotary table 16 or the like forming part of the rig 10. The Kelly 17 and drill string 12 are suspended by a hook 18 coupled to the Kelly 17 by a rotatable swivel 19. Drilling fluid (mud) 6 is stored in a pit 7 and is pumped through the center of the drill string 12 by a mud pump 9 to flow downwardly. After circulation through the bit 15, the drilling fluid circulates upwardly through an annular space between the borehole 11 and the outside of the drill string 12. Flow of the drilling mud 6 lubricates and cools the bit 15 and lifts drill cuttings made by the bit 15 to the surface for collection and disposal. As shown, a logging tool 14 is connected to the drill string 12. Signals measured by the logging tool 14 may be transmitted to the surface computer system 13 or stored in memory (not shown) onboard the tool 14. The logging tool 14 may include any number of conventional sources and/or sensors known in the art.

Formation logging data, whether from wireline, LWD, MWD, or LWT operations, are then processed to derive formation properties (formation profiles). Various techniques are known for deriving formation properties from the measurement data. Some of these techniques are specific to the types of measurement data (e.g., sonic data, resistivity data, NMR data, neutron data, gamma ray data, etc.). A common technique used to extract formation properties from measurement data involves an inversion process, which in essence attempts to find an inverse response function of the tool used in the measurements.

Formation logging data acquired with a sensor depends on not only the formation properties (profiles), but also the response function of the sensor. If the sensor response function, or its inverse (i.e., the inverse sensor response function), is known, then the formation profile may be deconvolved from the measurement data. Such a process of deriving formation properties directly from the measurement data is referred to as an inversion process.

An alternative to the inversion process is sometimes called "forward modeling." In this approach, a particular formation model is assumed. The formation model includes various layers, each having a set of properties (parameters). The tool responses are then calculated based on the formation model. The computed tool responses are then compared with the actual tool responses. An iterative process is then used to alter formation model parameters in order to minimize the difference between the computed tool responses and the actual tool responses. The modeling method is efficient when only a limited parameters are to be optimized. However, this approach can become very inefficient and time consuming when a large number of formation parameters are to be derived.

While the above described methods are useful in deriving formation properties from measurement data, there still exists a need for other methods and systems that can efficiently provide estimates of formation properties from the measurement data.

SUMMARY OF INVENTION

One aspect of the invention relates to methods for extracting formation properties from formation logging data. A method in accordance with one embodiment of the invention includes obtaining a deconvolution filter; and processing the formation logging data using the deconvolution filter to produce estimates of the formation properties.

Another aspect of the invention relates to methods for estimating an inverse response function of a tool. A method in accordance with one embodiment of the invention includes obtaining rough estimates of formation parameters; generating a plurality of forward models based on the rough estimates, wherein at least one value in the rough estimates is allowed to vary within a selected range; generating sensor responses from the plurality of forward models; and deriving a Wiener filter from the generated sensor responses.

Another aspect of the invention relates to systems for extracting formation properties from formation logging data. A system in accordance with one embodiment of the invention includes a central processing unit and a memory, wherein the memory stores a program having instructions for performing a method that includes designing a deconvolution filter; and processing the formation logging data using the deconvolution filter to produce estimates of the formation properties.

Other aspects and advantages of the invention will be apparent from the following description and the appended claims.

BRIEF DESCRIPTION OF DRAWINGS

FIGS. 8(A)-8(C) show results of permittivity as derived with a method of the invention.

DETAILED DESCRIPTION

Embodiments of the invention relate to methods and systems for deconvolving logging data from formation logging operations to derive formation properties. Embodiments of the invention estimate formation properties based on deconvolution processes. In accordance with some embodiments of the invention, methods of the invention use Wiener deconvolution (which may be multi-channel deconvolution) to extract formation properties from the well-logging data. In accordance with other embodiments of the invention, deconvolved data obtained from deconvolution processes (e.g., Wiener deconvolution) may be further processed using a diffusion filter (e.g., a nonlinear anisotropic diffusion filter) to improve the estimates of bed profiles.

Figure 1:
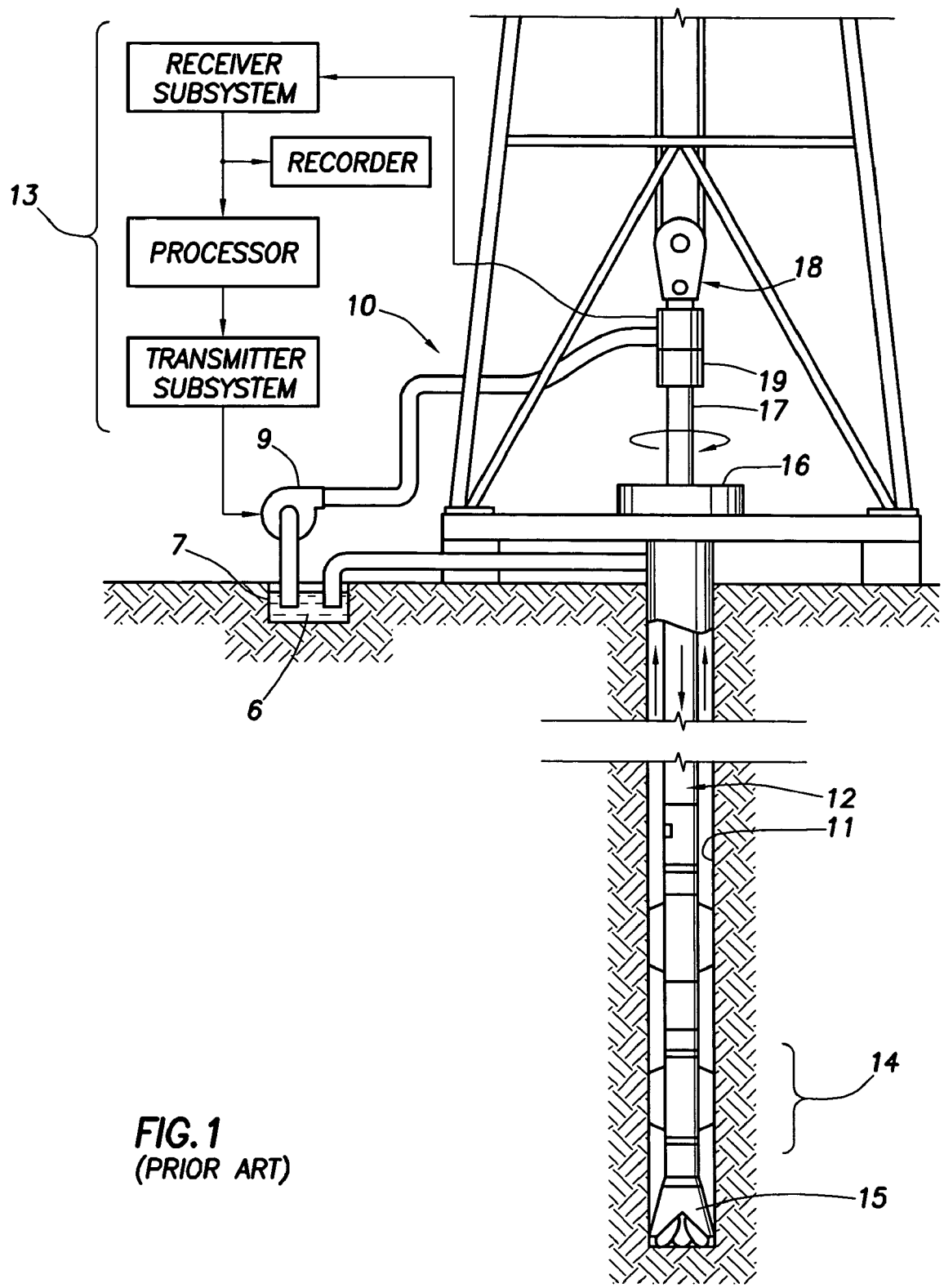
FIG. 1 shows a prior art logging-while-drilling system.
Figure 2:
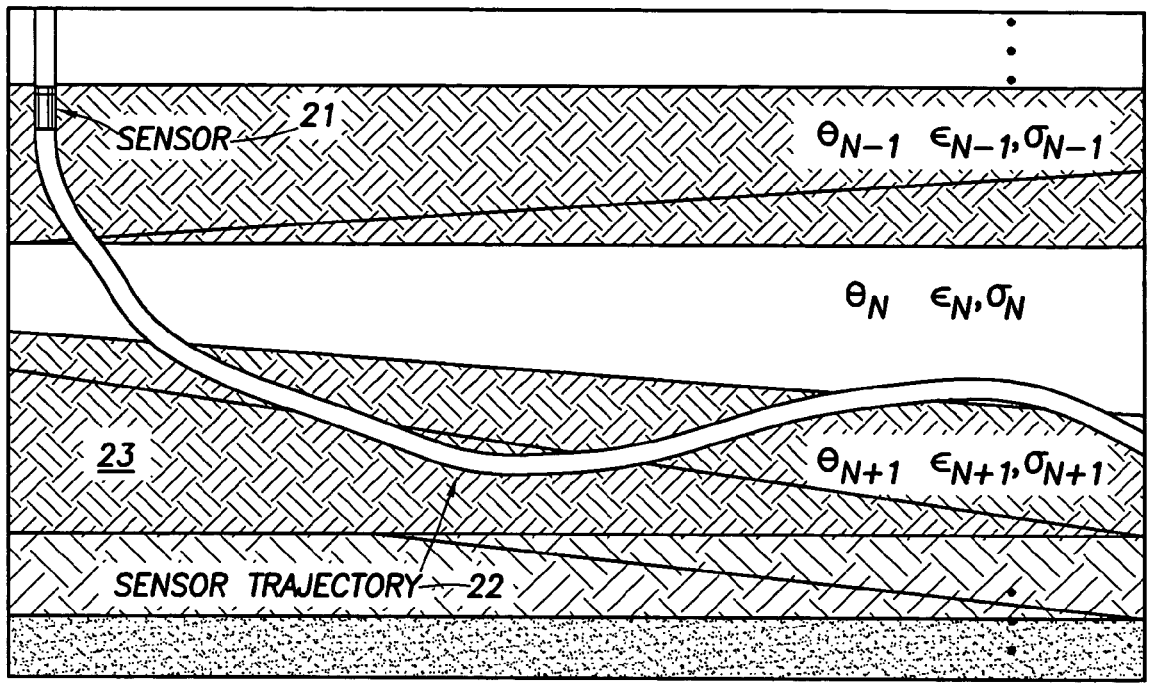
FIG. 2 shows a schematic of logging tool disposed in a wellbore penetrating a formation having different layers with different properties.

Methods in accordance with embodiments of the invention are applicable to various LWD, MWD, LWT, and wireline tools. However, for clarity of illustration, the following description uses high-resolution real-time imaging data obtained from LWD operations as examples. A typical logging environment is shown in FIG. 2, in which a downhole tool or sensor 21 moves along a trajectory 22. The earth formation 23 is displayed as a layered medium with each layer having its own electrical (conductivity, dielectric constant) and structural (e.g., dip or fracture) properties. The downhole tool or sensor 21, for example, may be an electromagnetic tool for measuring formation electrical properties (e.g., conductivities and dielectric constants).

Figure 3:
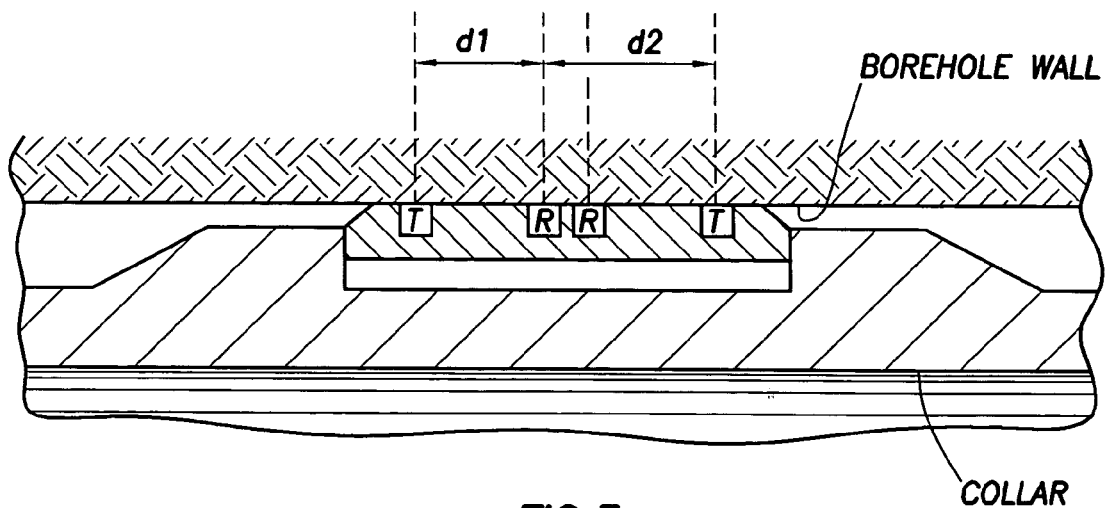
FIG. 3 shows a schematic of a conventional electromagnetic logging tool.

A typical electromagnetic (EM) downhole tool or sensor configuration is shown in FIG. 3. As shown in FIG. 3, the EM tool has two transmitters (T) and two receivers (R) disposed on an articulating pad. In a typical operation, the pad is pressed against the wall of the borehole to minimize distances between the antennas and the formation. The transmitters (T) energize the formation and the receivers (R) receive the signals that return from the formation. The transmitters (T) and receivers (R) are symmetrically located on the tools for borehole effect cancellation. Each of the antennas may be a broadside or an endfire antenna. One of ordinary skill in the art would appreciate that an EM tool may be operated at any appropriate frequency depending on the modes of operation (e.g., induction or propagation), for example, about 1 GHz for propagation measurements.

The measurement process begins by energizing each of the two transmitters sequentially and measuring phase shifts and amplitude attenuations in the signals received by the two receivers. One of ordinary skill in the art would appreciate that symmetrically located transmitters help compensate for the borehole effects. However, embodiments of the invention are not limited to data obtained with symmetrically located antennas. Measurements are performed at specified axial and azimuthal (with respect to tool-axis) locations. These data may then be inverted for formation properties, including bed-thickness, dip angles, fracture locations, conductivity, and dielectric constant, etc.

For clarity of illustration, the following description will assume that conductivity and dielectric constants are to be derived from the measured phase shifts ($\phi$) and amplitude attenuation (A) data obtained in resistivity logging. However, one of ordinary skill in the art would appreciate that the methods of the invention may also be used to derived other parameters, e.g., stand-off, dip angles, fracture locations, etc. In addition, methods of the invention may also be applied to other types of logging data.

In a typical approach, the logging data are processed with an inversion scheme to derive the formation properties. The fastest and simplest inversion scheme assumes a homogeneous medium at each measurement point and disregards the presence of bed-boundaries and other discontinuities. With the assumption of a homogeneous medium, permittivity ($\epsilon = \epsilon_0 \cdot \epsilon_r$) and conductivity ($\sigma$) may be obtained by solving the following transcendental equations, depending on antenna configurations:

Endfire: (1)

$$jkd = -\ln\frac{H_2}{H_1} + 3\ln\frac{d_1}{d_2} + \ln\frac{j - kd_2}{j - kd_1}$$

Broadside: (2)

$$jkd = -\ln\frac{H_2}{H_1} + 3\ln\frac{d_1}{d_2} + \ln\frac{j - kd_2 - j(kd_2)^2}{j - kd_1 - j(kd_1)^2}$$

where j is $\sqrt{-1}$, k is a complex propagation constant (defined below), and $H_1$ and $H_2$ are magnetic fields at receivers 1 and 2, respectively. The receivers are located at $d_1$ and $d_2$ from the transmitter, and $d=d_2-d_1>0$ is the separation between the two receivers. Complex propagation constant (k) is defined as: $k=k_0\sqrt{\tilde{\epsilon}_r}$, wherein $k_0$ is the free-space propagation constant and $$\tilde{\epsilon}_r = \epsilon_r - j\frac{\sigma}{\omega\epsilon_0},$$

wherein $\epsilon_r$ is relative permittivity constant, $\epsilon_0$ is permittivity in free space, and $\omega$ is the antenna frequency.

The $\epsilon$, $\sigma$ thus obtained are apparent values. The inversion involving a homogeneous medium is the simplest and fastest way to invert the phase and attenuation measurement data for conductivity and dielectric constant ($\sigma$, $\epsilon$,) of the formation. However, the method is not ideal for removing oscillations near bed boundaries. This scheme is better suited for cases where the sensors operate at lower frequencies or the bed thicknesses are large. However, in the GHz frequency range, the measurement of phase shift and amplitude attenuation of the voltage at the receivers may be corrupted by multiple reflections of the EM waves from bed boundaries. These shoulder-bed effects render the simple inversion method less useful.

An alternative approach to estimating formation properties is to solve an optimization problem, in which a certain layered formation model is assumed. Tool responses are then computed based on the assumed formation model, and then the error between the modeled data and the measured data (e.g., phase shifts and attenuations) is minimized by iteratively varying formation model parameters. However, in order to take into account various formation properties (including bed thickness, dielectric constant and conductivity of each layer with a number of layers), the formation model would necessarily be of a very high dimensionality. Although there are methods that can handle large optimization problems, in which some or all of the parameters are assumed to have discrete values, these processes can be quite time consuming. See e.g., J. C. Goswami et al., "*A Robust Technique for Well-Log Data Inversion,*" IEEE Transaction on Antennas and Propagation, pp. 717-724, March 2004.

Embodiments of the invention use deconvolution methods to derive formation properties. Some embodiments of the present invention use a novel technique based on Wiener filters (particularly, multi-channel Wiener filters) to extract formation properties.

Deconvolution

As noted above, formation logging data acquired with a sensor depends on not only the formation properties (profiles), but also the response function of the sensor. In other words, formation measurement data may be described as:

$$g(x) = \int_{-\infty}^{\infty} K(x,y) \cdot f(y) \cdot dy,$$

where g(x) is the measurement data, K(x,y) is a sensor response function, and f(y) is the formation profile being measured. If the sensor response function, K(x,y) is known, then the formation profile f(y) may be deconvolved from the measurement data g(x) by applying an inverse of the sensor response function. In other words, $$f(y) = \int_{-\infty}^{\infty} H(x,y) \cdot g(x) \cdot dx,$$

wherein H(x,y) is an inverse sensor response function. It is worth noting that the relationship between f(y), g(x), and K(x,y) given above is a linear relationship. However, methods of the invention are also applicable to nonlinear inverse problems as well, where K(x,y) depends upon f(y).

Many deconvolution methods known in the art (such as Homomorphic deconvolution, and methods based on Fourier and other integral transforms) may be used. The noises in logging data are typically sinusoidal oscillations and filters, which perform optimization in the frequency domain, can selectively pick out and reject the sinusoidal components corresponding to the noises. One example and preferred embodiment is to use Wiener deconvolution. Wiener deconvolution (or Wiener filtering) is found to be particularly useful in deriving formation properties from logging data.

Wiener Filter

Wiener filter is an optimal filter for removing noises from signals that have been corrupted by measurement processes. The Wiener filter, also known as a minimum mean-square estimator, can avoid some of the difficulties inherent in inversion. As applied to formation property estimation, Wiener filter attempts to model errors in the measurement data through the use of statistical methods. After the errors are modeled, the average error is mathematically minimized, thus the term minimum mean-square estimator. Wiener deconvolution can be used effectively when the frequency characteristics of the measurement data and additive noise are known, to at least some degree. In the absence of noise, the Wiener filter reduces to the ideal inverse filter.

Figure 4:
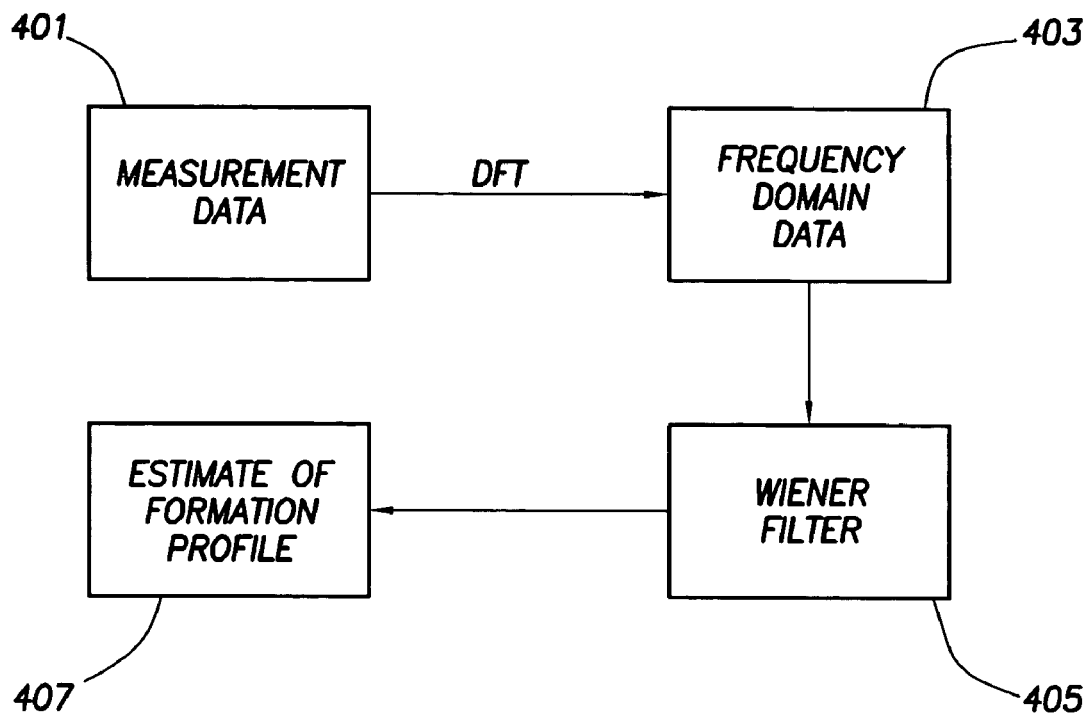
FIG. 4 shows a schematic of a method for extracting formation properties from measurement data in accordance with one embodiment of the invention.

In accordance with some embodiments of the invention, a Wiener filter may be used to estimate the inverse of multi-channel sensor impulse responses in the spectral domain. See, Julius Bendat and Allan Piersol, "*Random Data Analysis and Measurement Procedures,*" John Wiley & Sons, NY, 2002. FIG. 4 shows a schematic illustrating a general concept of using a Wiener filter to extract formation profiles from logging data. As shown in FIG. 4, the formation logging data 401 are first converted into frequency domain data 403 with Fourier transformation, such as Discrete Fourier Transform (DFT). The frequency domain data 403 are then multiplied by a Wiener filter 405 to produce an estimate of the formation profile 407. The formation profiles thus obtained are in the frequency domain, from which the formation profiles may be derived using an inverse DFT.

As shown in FIG. 4, if a proper Wiener filter (or other deconvolution function) is available, the formation properties (or formation profiles) may be estimated from the measurement data. In order to find a proper Wiener filter for the estimation, some embodiments of the invention use a training data set to determine a proper Wiener filter.

Multi-channel Wiener filter is based on the Wiener-Hopf equation that relates input-output spectra of a linear system. Analysis of coherence estimates shows that the system can be approximated as linear in a small neighborhood of parameter space. Thus, the inherent non-linearity may be addressed by linearizing the problem over a small region in the parameter space (permittivity, conductivity, and angle of deviation) and applying deconvolution filter at each point. In accordance with embodiments of the invention, the Wiener filters are optimal filters that perceive nonlinear portion of the oscillations near layer boundaries as noise and get the best possible estimate of the linear portion in a least square sense.

Figure 5:
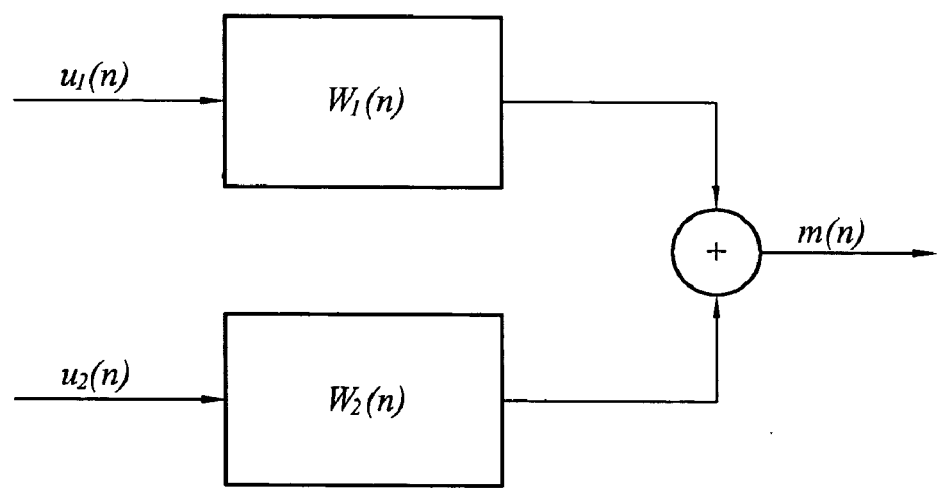
FIG. 5 shows a schematic of a two input system in accordance with one method of the invention.

While embodiments of the invention may be applied to single channel or multi-channel deconvolution, the following description will use a two input/two output system to illustrate a method of the invention. The Wiener-Hopf equation for a two-input/two-output system, as shown in FIG. 5, is given by:

$$G_{mu_1}(f) = W_1(f) G_{u_1 u_1}(f) + W_2(f) G_{u_1 u_2}(f)$$

$$G_{mu_2}(f) = W_1(f) G_{u_2 u_1}(f) + W_2(f) G_{u_2 u_2}(f) \quad (3)$$

where m is the output and $u_1$ and $u_2$ are inputs to the inverse systems, represented by transfer functions $W_1$ and $W_2$. The notation $G_{xy}(f)$ denotes power spectral densities between x and y. Here, the two inputs, for example, may be measured phase and attenuation or apparent conductivity and permittivity (which may be derived from a simple inversion assuming a homogeneous formation as described above), whereas the output, for example, may be the estimated permittivity or conductivity.

The first step is to estimate impulse response functions $W_1$ and $W_2$. These filters are estimated through training on a set of forward and inverse models. For example, one may start with a set of known formation profiles (i.e., $\sigma$ and $\epsilon$ and layer thickness) and compute phase and attenuation using the forward model (which, for example, may include dipole transmitters and receivers in a layered medium). The data generated by the forward model may be averaged to reduce random error in estimation. The data generated by forward model (e.g., the computed phase shifts and attenuations) correspond to the inputs $u_1$ and $u_2$ in FIG. 5 and m is the known profile. Equation (3) is then solved for $W_1$ and $W_2$. It is worth mentioning here that equation (3) represents an over-determined system of equations. Therefore, $W_1$ and $W_2$ are its solution in the least squared sense. Once these filters are available (for example, one filter each for conductivity and permittivity), they can be applied to any arbitrary formation profile to estimate its properties.

Figure 6:
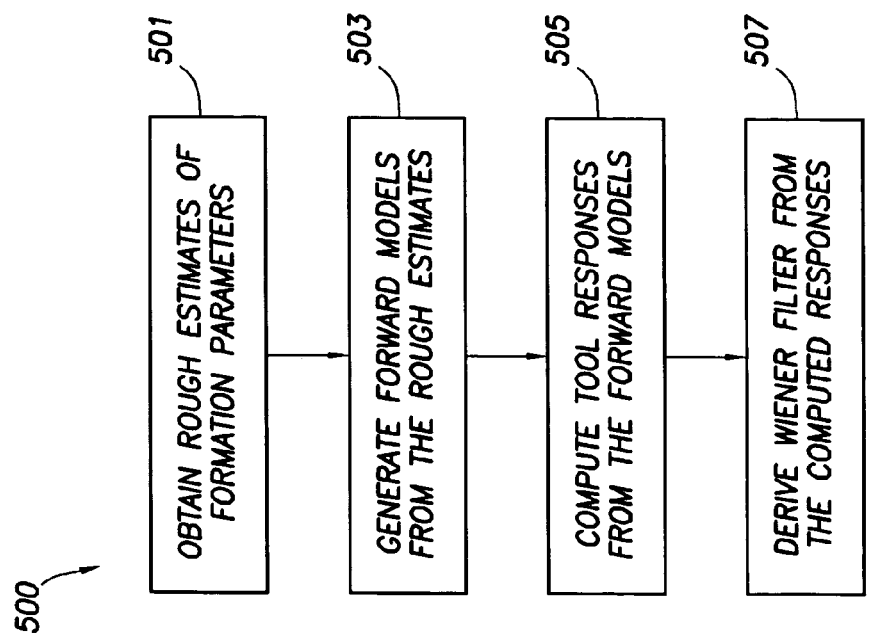
FIG. 6 shows a method for deriving a Wiener filter in accordance with one embodiment of the invention.

FIG. 6 shows an example of a method 500 for deriving a Wiener filter. As shown, a set of rough estimates (or a range of estimates) of formation parameters may be obtained (step 501). A range of estimates for use with embodiments of the invention, for example, may be obtained by varying one or more values in the rough estimates within a selected range (e.g., ±10% of the rough estimates). These rough estimates (or a range of estimates) may be based on information related to the formation from other sources (e.g., other logging operations, know geophysical properties from nearby wells, etc.). The rough estimates (or a range of estimates) are then used to generate a set of formation models (forward models) (step 503). In this process, each or some values of the rough estimates may be allowed to vary within a selected range (e.g., an error range or an expected deviation). The set of forward models are then used to generate a set of expected tool responses (step 505). These tool responses form the "training set" for deriving a Wiener filter (step 507). One method of deriving a Wiener filter from the "training set" is to use a statistic method to model the errors in the data set. After the errors are modeled, the average error is mathematically minimized. The Wiener filter can then be derived.

Figure 7:
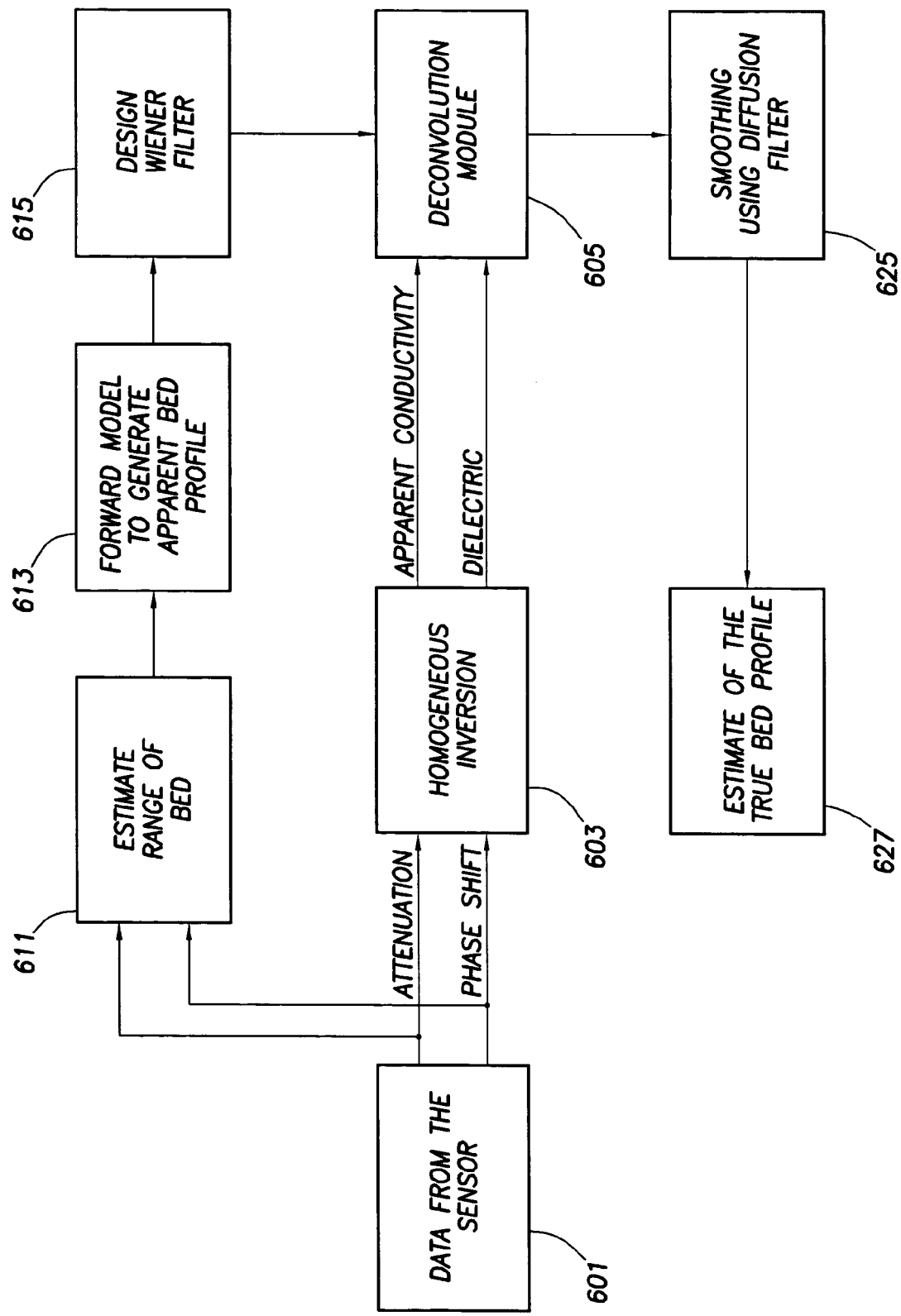
FIG. 7 shows a method for extracting formation properties from measurement data in accordance with one embodiment of the invention.

FIG. 7 shows a general scheme of a method in accordance with one embodiment of the invention for deriving formation properties (bed boundaries, layer conductivities, dielectric constants, etc.) from well log data. As shown in FIG. 7, measurement data from the logging tool or sensor in a logging operation (step 601) may be used to estimate the range of formation layers (beds) (step 611). The estimate of the beds is then used in a forward model to generate apparent bed profiles (step 613). The apparent bed profiles are then used to generate a set of data as a training set to design a Wiener filter (step 615). The Wiener filter is then used as a deconvolution module (605) to derive estimates of the formation properties from the logging data. In some embodiments of the invention, the initial estimates from the Wiener deconvolution may be further subjected to smoothing using a diffusion filter (step 625) to produce the estimate of the true bed profiles (627).

While the method shown in FIG. 7 describes a method for deriving a filter (e.g., a Wiener filter) before determining formation property estimates from the log data. In other embodiments, filters (e.g., Wiener filters) developed in a previous case may be used. That is, there is no need to derive a filter for each application.

It has been observed that these Wiener filters reduce oscillations near layer boundaries. Boundaries become more distinctly visible. However, due to error in approximation of the impulse response, some high frequency noise may be introduced. While a linear low-pass filter may be used to smoothen noise, this would also smoothen discontinuities at boundaries. It is desirable that such filters do not significantly impact the boundaries between formation layers Therefore, in accordance with some embodiments of the invention, a diffusion filter (e.g., a nonlinear anisotropic diffusion filter) may be used to smoothen the intra-boundary variations, without any appreciable effect on inter-boundary variations. In accordance with embodiments of the invention, diffusion filters may be used to reduce the high frequency noises introduced by the Wiener filter. In some embodiments of the invention, the diffusion filters are anisotropic diffusion filters.

Diffusion Filter

Diffusion filter can be used to smooth data, either after Wiener filter processing or by itself Diffusion filters were introduced by Perona and Malik, who formulated filtering as a diffusion process. See, P. Perona and J. Malik, "*Scale-Space and Edge Detection Using Anisotropic Diffusion,*" IEEE Transaction on Pattern Analysis and Machine Intelligence, 12(7): 629-639, 1990. The process is defined by the following equation:

$$\frac{\partial}{\partial t} S(x, t) = \nabla g(c(x, t) \nabla S(x, t)), \quad (4)$$

where S(x,t) is the signal at t iteration and c(x,t)=f(|∇S(x,t)|) is the diffusion function. The term Φ(x,t)=c(x,t)·∇S(x,t) is the flow function. The diffusion filter may be an isotropic filter or an anisotropic filter, which may be a linear or non-linear filter. The diffusion function is assumed to be a Gaussian in gradient magnitude, parameters of which are chosen such that the sample points with small gradients (flat regions) and steep regions (edges) are less affected, whereas the intermediate regions are smoothened. A suitable diffusion filter may be derived using an iterative process to find appropriate parameters.

Test Results

Methods of the invention have been found to be able to efficiently derive formation properties from measurement data. FIGS. 8(A)-8(C) illustrate results for permittivity determination using a method of the present invention. In this test, an arbitrary profile of 20 horizontal layers is considered. The relative permittivity is chosen randomly in the range of 4 to 20, while the conductivity is between 0.005 and 2 S/m. FIGS. 8(A) and 8(B) show the attenuation and phase that the tool will measure as a function of scan distance. FIG. 8(C) shows the estimated permittivity. For comparison purposes, the exact profile is also plotted. As shown in FIG. 8(C), results from Wiener deconvolution followed by diffusion filtering (dashed line), in accordance with a method of the invention, almost overlay with the exact profile (dotted line). These results confirm the accuracy of methods of the invention.

Figure 9:
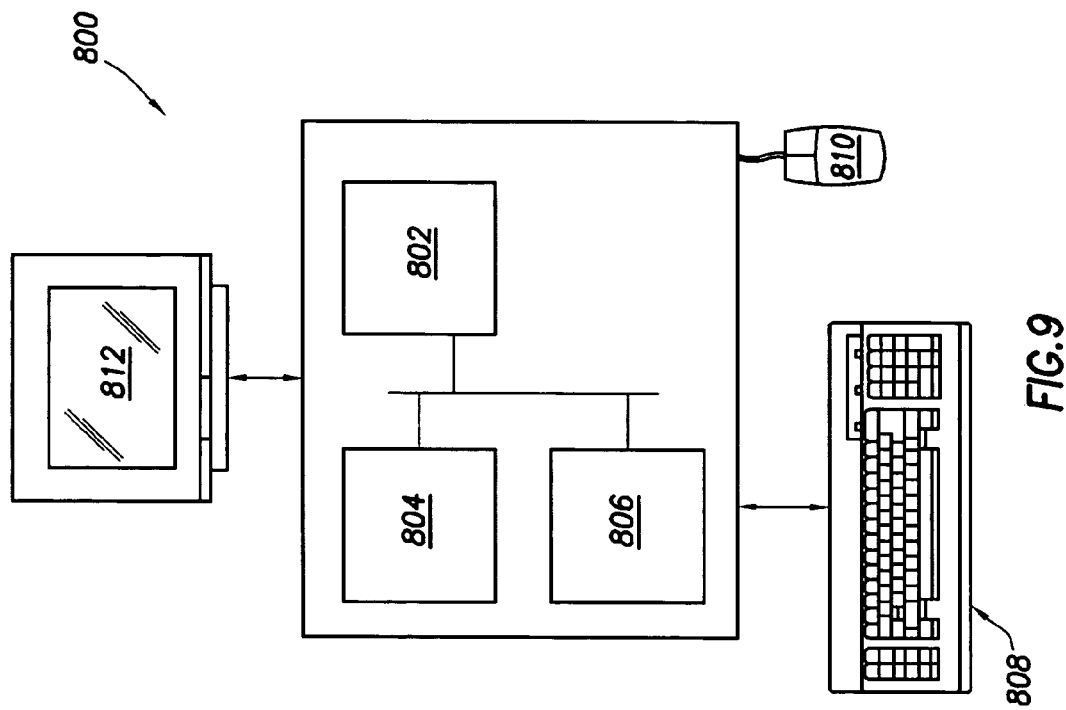
FIG. 9 shows a general purpose computer that may be used with embodiments of the invention.

Some embodiments of the invention relate to systems for estimating formation properties from measurement data. A system of the invention may be implemented on any computer known in the art. For example, FIG. 9 shows a general purpose computer 800, having a display 812 and a main unit comprising a storage (e.g., hard drive or non-volatile memory) 804, a central processor unit 806, and a random memory 808. The storage (e.g., non-volatile memory) may store a program for executing instructions to perform a method of the invention. In addition, the computer 800 may include input devices, such as a key board 808 and/or a mouse 810. Some embodiments of the invention relate to storage media that include a program for performing a method of the invention. The storage media may comprise a floppy disk, a hard disk, an optical disk (e.g., a CD, DVD, or the like), a tape, etc.

Advantages of embodiments of the invention may include one or more of the following. Methods of the invention use deconvolution process to estimate formation profiles form measurement data. These methods may be applied to various types of measurement data. In addition, methods of the invention are efficient and can produce accurate results.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to determine one or more formation properties of a formation traversed by a borehole, comprising;
    disposing a tool or sensor in a borehole;
    obtaining a non-linear signal from the formation using the tool or sensor;
    using a deconvolution filter to remove an unwanted portion of the non-linear signal to produce a filtered signal, wherein the deconvolution filter is obtained by training on a set of data; and
    determining the one or more formation properties from the filtered signal.

2. The method of claim 1, wherein the deconvolution filter comprises a Wiener filter.

3. The method of claim 1, wherein the deconvolution filter comprises a linear filter.

4. The method of claim 1, wherein the deconvolution filter comprises a non-linear filter.

5. The method of claim 1, wherein the deconvolution filter comprises an optimal filter.

6. The method of claim 1, wherein the deconvolution filter is for a multi-channel system.

7. The method of claim 1, wherein the deconvolution filter is for a single channel system.

8. The method of claim 1, wherein the deconvolution filter is a previously designed filter.

9. The method of claim 1, wherein the set of data is derived from a forward model, one or more measurements, or a combination of modeled and measured values.

10. The method of claim 1, further comprising using a diffusion filter to smooth the formation properties.

11. The method of claim 10, wherein the diffusion filter is computed using an iterative scheme.

12. The method of claim 10, wherein the diffusion filter is a nonlinear anisotropic diffusion filter.

13. The method of claim 1, wherein the formation properties comprise at least one of a dielectric constant, a conductivity, a dip angle, a bed thickness, and a fracture location.

14. The method of claim 1, wherein the non-linear signal is acquired with a logging-while-drilling tool, a wireline tool, a logging-while-tripping tool, or a permanently placed sensor.

15. A method to determine one or more formation properties of a formation traversed by a borehole, comprising:
    disposing a tool or sensor in the borehole;
    obtaining a non-linear signal from the formation using the tool or sensor,
    estimating an inverse response function of the tool or sensor, the estimating comprising:
        (a) obtaining rough estimates of formation properties;
        (b) generating a plurality of formation properties by allowing at least one value in the rough estimates to vary within a selected range;
        (c) generating a plurality of formation profiles based on the plurality of sets of formation properties;
        (d) generating tool or sensor responses from a forward model and the plurality of formation profiles; and
        (e) deriving deconvolution filter from the generated tool or sensor responses;
    using the deconvolution filter to remove an unwanted portion of the non-linear signal to produce a filtered signal; and
    determining the one or more formation properties from the filtered signal.

16. The method of claim 15, further comprising using a diffusion filter to smooth the formation properties.

17. The method of claim 15, wherein the formation properties comprise at least one of conductivity, permittivity, dip angle, fracture location, and bed thickness.

18. The method of claim 15, wherein the deriving the deconvolution filter comprises using a statistical method to model errors in the generated tool or sensor responses.

19. A method to determine one or more formation properties of a formation traversed by a borehole, comprising:

disposing a tool or sensor in the borehole;

obtaining a signal from the formation using the tool or sensor;

processing the signal to obtain an estimate of the formation properties;

using a diffusion filter to remove one or more unwanted contributions to the estimated formation properties to produce filtered estimated formation properties; and determining the one or more formation properties from the filtered estimated formation properties.

20. The method of claim 19, wherein the diffusion filter is an anisotropic diffusion filter.

21. The method of claim 20, wherein the anisotropic diffusion filter is a non-linear filter.

* * * * *